(12) United States Patent
Setina

(10) Patent No.: US 8,615,932 B2
(45) Date of Patent: Dec. 31, 2013

(54) BARRIER ELEMENT FOR VEHICLE DOOR

(76) Inventor: Terry L. Setina, Olympia, WA (US)

( * ) Notice: Subject to any disclaimer, the term of this patent is extended or adjusted under 35 U.S.C. 154(b) by 1 day.

(21) Appl. No.: 13/226,028

(22) Filed: Sep. 6, 2011

(65) Prior Publication Data

US 2013/0055643 A1 Mar. 7, 2013

(51) Int. Cl.
B60J 5/04 (2006.01)

(52) U.S. Cl.
USPC .......... 49/502; 49/70; 296/146.7; 296/136.07

(58) Field of Classification Search
USPC ............ 49/70, 460, 502; 296/136.01, 136.07, 296/39.1, 1.08, 1.09, 146.7
See application file for complete search history.

(56) References Cited

U.S. PATENT DOCUMENTS

| 3,855,898 | A | * | 12/1974 | McDonald | 89/36.08 |
| 4,696,848 | A | * | 9/1987 | Jones et al. | 428/80 |
| 4,706,775 | A | * | 11/1987 | Berg | 180/289 |
| 4,949,508 | A | * | 8/1990 | Elton | 49/502 |
| 5,090,762 | A | * | 2/1992 | Krieger | 296/39.1 |
| 5,438,908 | A | * | 8/1995 | Madden, Jr. | 89/36.08 |
| 5,811,719 | A | * | 9/1998 | Madden, Jr. | 296/146.7 |
| 5,820,191 | A | | 10/1998 | Blakewood, Jr. et al. | |
| 6,092,858 | A | | 7/2000 | Bolwell | |
| 6,158,789 | A | * | 12/2000 | Fett et al. | 292/346 |
| 6,626,477 | B2 | | 9/2003 | Maynard et al. | |
| 6,926,341 | B1 | | 8/2005 | Addesso et al. | |
| 7,052,069 | B2 | * | 5/2006 | Vance et al. | 296/39.1 |
| 7,686,379 | B2 | * | 3/2010 | Lemieux | 296/148 |
| 2002/0017802 | A1 | * | 2/2002 | Edwards | 296/136 |
| 2004/0134626 | A1 | * | 7/2004 | Murray et al. | 160/105 |
| 2009/0151827 | A1 | * | 6/2009 | Thompson | 150/154 |

* cited by examiner

Primary Examiner — Katherine Mitchell
Assistant Examiner — Scott Denion
(74) Attorney, Agent, or Firm — Klarquist Sparkman, LLP

(57) ABSTRACT

A barrier element for protecting an interior vehicle door panel comprises a body shaped to fit over the vehicle door interior panel and to block access to at least one of an interior door handle, a lock control and a window control. The barrier element is removably securable to the vehicle door or to the vehicle door panel such that the barrier element can be removed to expose the panel.

9 Claims, 4 Drawing Sheets

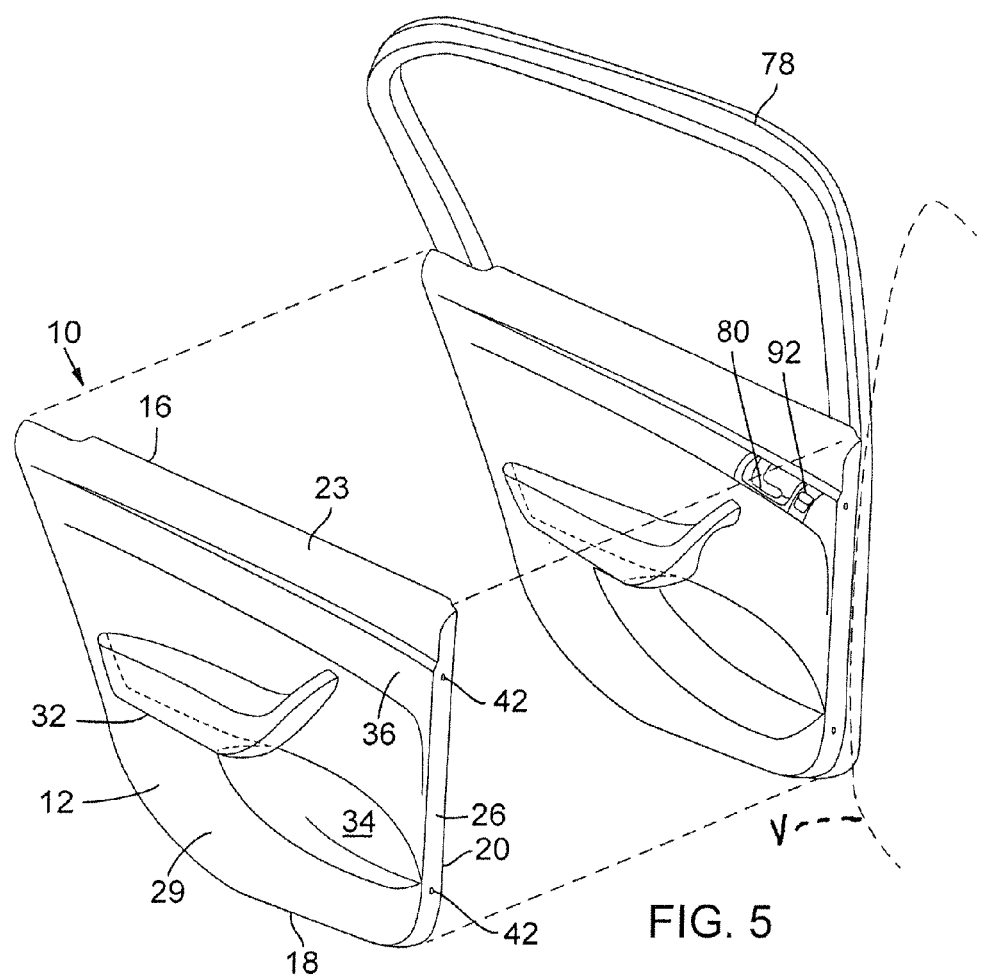

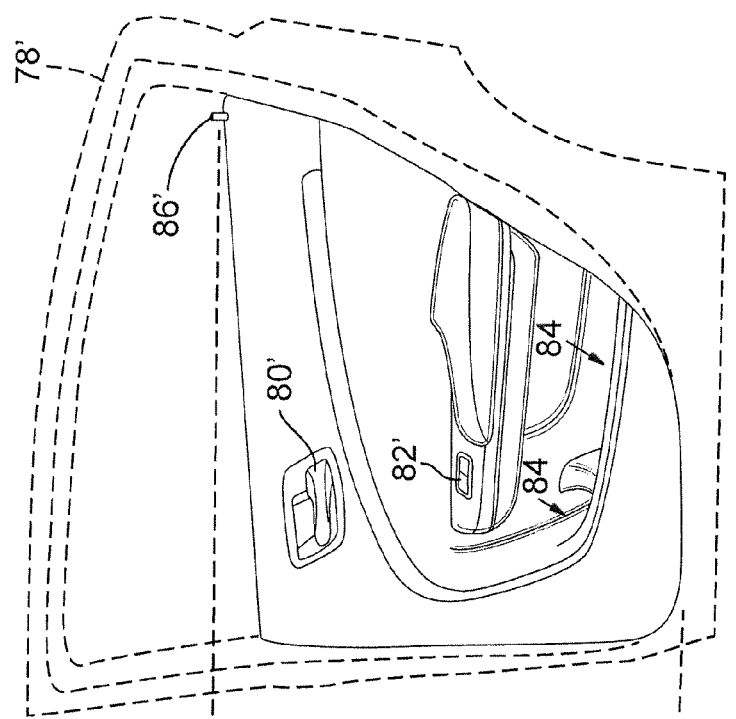
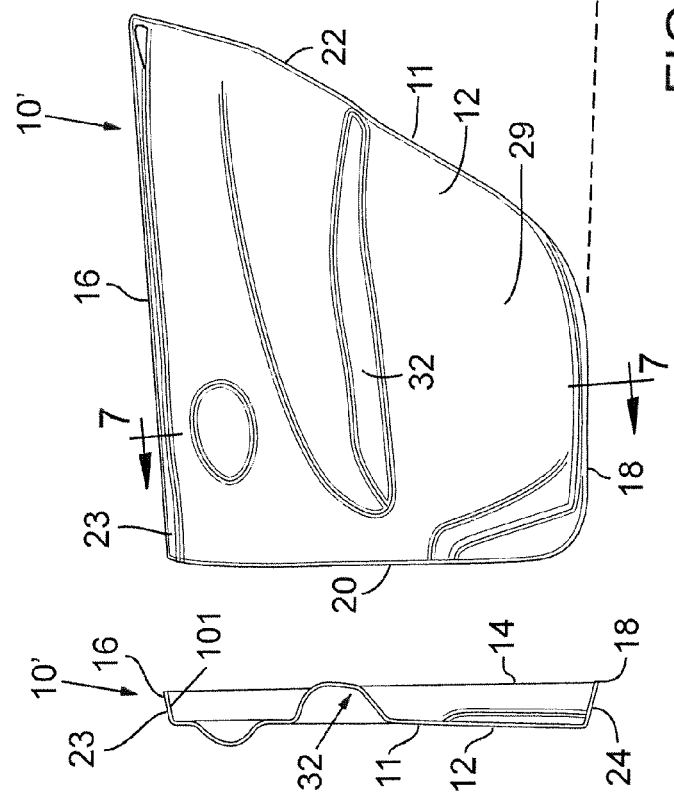

BARRIER ELEMENT FOR VEHICLE DOOR

FIELD

This application relates to motor vehicles, and in particular, to a barrier element positionable to protect the interior of a vehicle door.

BACKGROUND

Most motor vehicles sold today have interiors with plastic, cloth, vinyl, leather and/or other comparatively "soft" materials components serving primarily non-structural purposes while adjacent metal, fiberglass or other "hard" materials components serve structural purposes. For example, vehicle doors usually have a sheet metal skin, internal steel structural members and one or more interior panels made of a soft material(s). The interior panels made of soft materials are typically designed to be aesthetically pleasing, even though they may serve to add functionality, such as by defining storage features, rests, etc.

A motor vehicle's value is generally diminished if its interior is damaged or worn, even if the remainder of the vehicle is well maintained. Interior door panels in law enforcement vehicles receive significant wear from heavy use, particularly from rear seat occupants. Because such vehicles may be sold for other uses after only a few years, fleet managers seek to preserve the interiors, including disassembling the OEM interior door panels from the remainder of the doors and replacing them with an aftermarket replacement panel.

Aftermarket replacement panels usually provide additional features, too. Law enforcement vehicles may have replacement panels that would limit a rear seat occupant's access to a door handle, a lock control, a window control or a hiding place for contraband.

The conventional approach of removing the original OEM panels, storing them and installing replacement panels requires fleet managers to track and store the removed panels for long periods, which becomes expensive due to the space required for storage and the hours required to maintain, track and re-install them.

SUMMARY

Described below is a barrier element for a vehicle door that addresses shortcomings in conventional approaches to preserving vehicle interiors.

According to one implementation, a barrier element for protecting an interior vehicle door panel comprises a body shaped to fit over the vehicle door interior panel and to block access to at least one of an interior door handle, a lock control and a window control. The barrier element is removably securable to the vehicle door or to the vehicle door panel such that the barrier element can be removed to expose the panel.

The barrier element can be formed integrally as a single piece. The barrier element can be made of vacuum formed plastic. The barrier element can be formed of any suitable material, such as metal, fiberglass, polypropylene or carbon fiber, as just several examples.

The barrier element can be shaped to substantially cover the vehicle door interior panel when secured to the vehicle door or vehicle door interior panel. The barrier element can be shaped to cover at least one recess in the vehicle door interior panel when secured to the vehicle door or vehicle door interior panel. The barrier element can comprise a planar or a convex surface in the area of the recess in the door panel.

The barrier element can be smoothly contoured. The barrier element can be generally free from sharp corners and sharp projections. The top side surface of the barrier element can smoothly join the main surface.

The barrier element can be removably securable with fasteners. The fasteners can be positioned to be relatively inaccessible when the vehicle door is closed. The barrier element can comprise at least a main surface and an adjoining side surface, and wherein the barrier element can be removably securable by fasteners extending through apertures in the side surface. The barrier element can comprise at least a main surface and adjoining forward, rear, top and bottom side surfaces, and wherein the barrier element can be removably securable by fasteners positioned to extend through at least two of the side surfaces. In another embodiment, the barrier element is secured with an adhesive.

In one implementation, the barrier element is configured to prevent access to the lock control located on the vehicle door interior panel when the barrier panel is installed over the vehicle door interior panel. In another implementation, the barrier element is configured to prevent access to the window control located on the vehicle door interior panel when the barrier panel is installed over the vehicle door interior panel. In another implementation, the barrier element is configured to prevent access to the interior door handle on the vehicle door interior panel when the barrier panel is installed over the vehicle door interior panel.

The body of the barrier element can be shaped to define a protruding arm rest portion shaped to cover an arm rest portion of the vehicle door interior panel.

According to a method implementation, protecting an interior panel of a vehicle door comprises securably fastening a barrier element over the vehicle door interior panel, positioning a barrier element over at least a portion of the vehicle door interior panel and blocking access to at least one of a door handle, a lock control and a window control with the barrier element.

The method can include securing the barrier element to the vehicle door panel or the vehicle door with fasteners. The method can also include removing the barrier element to expose the vehicle door interior panel.

The foregoing and other objects, features, and advantages of the invention will become more apparent from the following detailed description, which proceeds with reference to the accompanying figures.

BRIEF DESCRIPTION OF THE DRAWINGS

FIG. 5 is an exploded perspective view showing the barrier element of FIG. 1 aligned for mounting to a vehicle door.

FIG. 6 is an exploded elevation view of a barrier element according to another implementation and a vehicle door interior panel.

FIG. 7 is a section view taken along the line 7-7 in FIG. 6.

DETAILED DESCRIPTION

Figure 1:
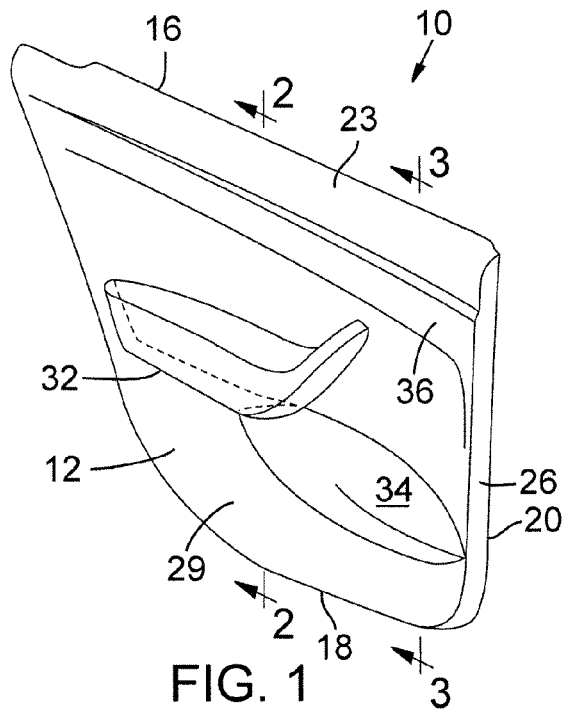
FIG. 1 is a perspective view of a barrier element for vehicle door interior panel showing the exposed side.
Figures 2, 3:
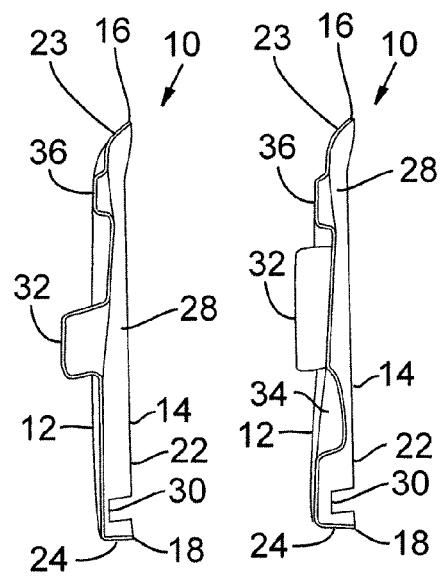
FIG. 2 is a section view of the barrier element in elevation taken at the line 2-2 of FIG. 1.
FIG. 3 is a section view of the barrier element in elevation taken at the line 3-3 of FIG. 1.

Referring to a FIGS. 1-4, a barrier element 10 for a vehicle door according to a representative implementation comprises a member 11 shaped to fit over the conventional original equipment interior door panel of a passenger vehicle. The barrier element 10 has an exposed side 12 (best shown in FIG. 1) that remains exposed to the vehicle interior after the barrier element has been installed over the interior door panel, and a reverse side 14 (best shown in FIG. 4) that is generally hidden from view after the barrier element has been installed.

The barrier element 10 in the illustrated implementation defines a top edge 16, a bottom edge 18, a forward edge 20 and a rear edge 22. As also shown, the top edge 16 forms an edge of a top surface 23, which in the illustrated implementation is a smoothly rounded surface. Similarly, the bottom edge 18, the forward edge 20, and the rear edge 22 form edges of a bottom side surface 24, a forward side surface 26, and a rear side surface 28, respectively. A main surface 29 is bordered by each of the side surfaces 23, 24, 26 and 28.

The various side surfaces may be distinctly defined from their adjacent surfaces by relatively sharp corners, e.g., as in the case of the top surface 23 relative to the forward side surface 26 and the rear side surface 28. Alternatively, the side surfaces may be relatively smoothly joined to adjacent surfaces, e.g., as in the case of the top surface 23 smoothly adjoining the main surface 29, as well as the side surface 24 smoothly adjoining the side surfaces 26 and 28.

In the illustrated implementation, there is an optional cutout 30 defined between the bottom side surface 24 and the rear side surface 28. In some implementations, the cutout 30 serves to provide clearance for an indicator light on the door to remain operative.

Figure 4:
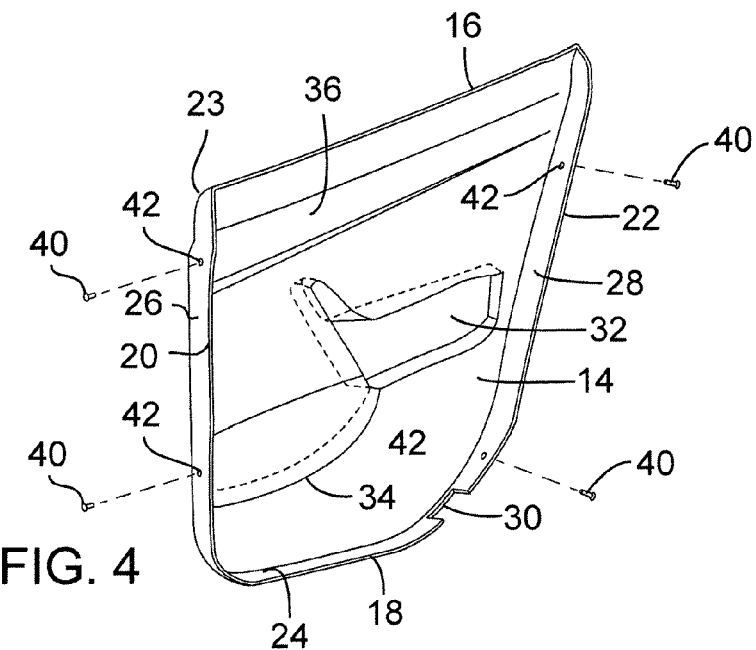
FIG. 4 is a perspective view of the barrier element of FIG. 1 showing the reverse side.

As shown in FIG. 4, the barrier member 10 in the illustrated implementation is attached to the vehicle door (not shown) by a suitable fastening arrangement, such as with plastic panel retaining fasteners 40 commonly used in the automotive industry. The fasteners 40 are inserted through apertures 42 formed in the barrier member 10 and corresponding apertures (not shown) formed in the door or door panel. In one example, ¼" or 3/16" fasteners are used. Alternatively, other fastening arrangements, such as conventional screws, hook and loop fasteners, snap-fit connections and/or reversible adhesives can be used, as appropriate (such as the adhesive 101 as shown in FIG. 7).

The fasteners 40 may be positioned to extend through the side surfaces as shown, which has an advantage of helping to conceal any corresponding apertures in the door or door panel if the barrier element 10 is later removed, e.g., in preparation to repurpose the vehicle, such as for resale. In some implementations, the fasteners 40 extending through the side surfaces are sufficiently close to other structure, e.g., the vehicle's door frame, such that they cannot be tampered with and removed while the door is closed.

The barrier member 10 is sized and shaped to block access to at least the door's interior handle, its lock control or its window control. In this way, an occupant in the seat adjacent the door cannot use the blocked handle or control to escape from the vehicle. Stated differently, the handle and control(s) are rendered temporarily inoperable while the barrier member is in place.

The term "handle" as used herein encompasses any structure actuatable to move the door from a closed position to an opened position. The term "lock control" as used herein encompasses any structure actuatable to reconfigure the door from a locked condition to a unlocked condition, and thus would include push/pull locks, sliding locks, unlock buttons, etc. The term "window control" encompasses any structure actuatable to move the window from a closed position to an opened position, including a window handle, a window crank, a button, etc.

FIG. 5 is an exploded perspective view showing the barrier member 10 aligned for installation on a vehicle door 78. In the illustrated implementation, the vehicle door 78 is the left rear door of a 2011 Chevrolet Caprice. As can be seen in FIG. 5, the barrier member 10 of the illustrated implementation will block access to the door handle 80 and the window control 82. No lock control is present on the vehicle door 78 because the door design of this implementation is specific to law enforcement applications and the door lock control for the rear doors is provided only in the driver's controls. If a lock control is present, the barrier member 10 can of course be configured to block access to it.

The barrier member 10 can be shaped as shown to fit flush against the interior door panel. In this way, interference between the barrier element and nearby structure, such as the seat when the door is closed, is minimized. In addition, the closely fit barrier member 10 does not introduce sharp corners or projections that could injure occupants, e.g., in the event of a collision. Further, by following the contours of the door panel, the barrier member 10 retains some limited functionality, if desired, e.g., the door panel's arm rest can be retained as a projecting element as shown in the arm rest portion 32. At the same time, the barrier member 10 can be shaped to eliminate access, e.g., by providing a covering surface, to a storage compartment or other area, hereinafter referred to as recesses, within the interior door where a prisoner might attempt to hide contraband.

Although not required, the barrier element 10 in the illustrated implementation substantially covers the interior door panel. In this way, the barrier member 10 protects the interior door panel from damage, such as damage from physical contact, fluids, etc. It should be noted that some implementations of the barrier element still substantially cover the interior door panel but may include one or more openings through the barrier element 10 that are of a relatively small overall size and proportion compared to the interior door panel. In other implementations of the barrier element, the door handle, the controls and only a portion of the panel are covered.

Figure 8:
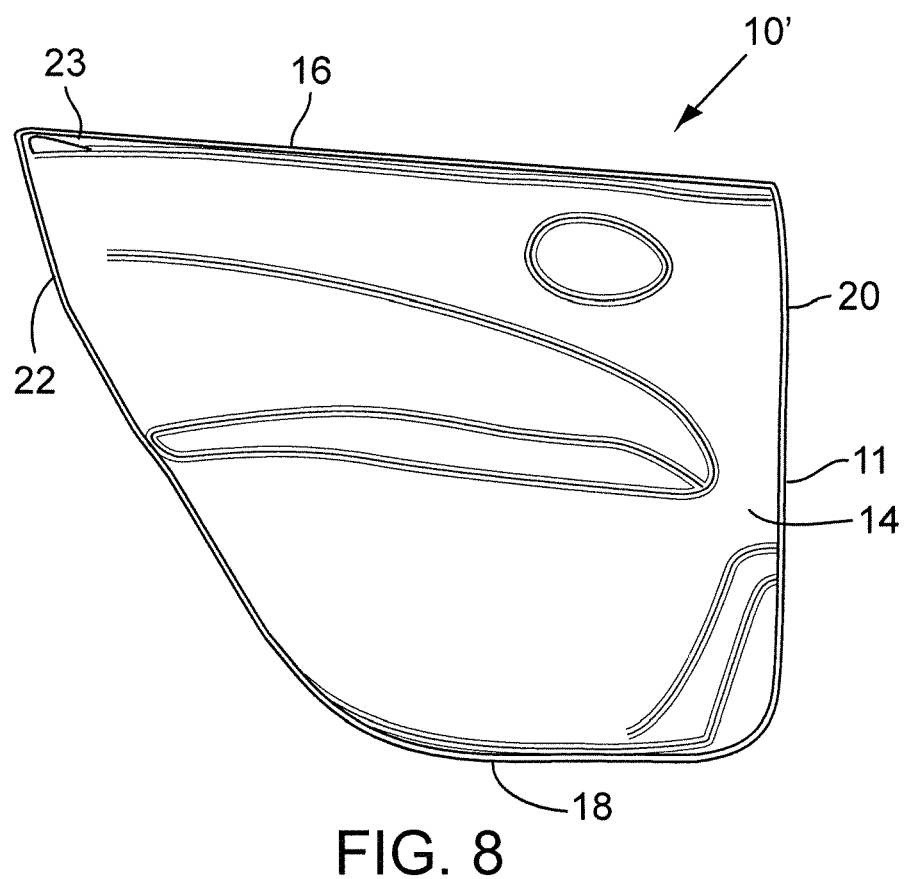
FIG. 8 is an elevation view showing a reverse side of the barrier element.

FIGS. 6, 7 and 8 show a barrier element 10' according to an alternative implementation. In FIG. 6, the barrier element 10' is shown prior to assembly over the interior panel of the door 78'. As can be seen, the barrier element 10' will prevent access to the door handle 80', the window control 82', a door lock 86' (which is a cylindrical push-pull lock), and two recesses 84' when the barrier element 10' is installed. FIG. 8 shows a section view of the barrier member 10'. FIG. 8 shows an elevation view of the reverse or generally hidden side of the barrier element 10'.

The barrier member is easy to clean. In the illustrated implementation, the barrier member is formed of a single material and has a relatively smooth surface, and thus it easy to wipe down, either with or without a cleaning solution. By contrast, the interior door panel could be formed of different materials, e.g., upholstered elements and plastic elements, each requiring different cleaning treatments. Thus, it is possible to remove all manner of substances, including, e.g., blood-borne pathogens, from the barrier member with routine cleaning operations. The barrier element is relatively free from convex surfaces, grooves or seams that would tend to trap fluids, including water and other cleaning solutions used to clean the barrier element.

When the barrier element is fitted over the interior door panel, there are few if any protrusions. As a result, the barrier element is also useful for canine units, since it helps resist damage from a dog's chewing and/or scratching of the door panel. The barrier element is also resistant to rusting.

According to one implementation, the barrier member 10, 10' is made of vacuum formed plastic. One suitable material is a thermoplastic olefin (TPO) in a thickness of about 0.187 inches supplied by Spartech Plastics. The TPO material is relatively easy to form, non-absorbing, impermeable and of sufficient durability to protect the interior door panel from damage.

In view of the many possible embodiments to which the disclosed principles may be applied, it should be recognized that the illustrated embodiments are only preferred examples and should not be taken as limiting in scope. Rather, the scope of protection is defined by the following claims. I therefore claim all that comes within the scope and spirit of these claims.

I claim:

1. A barrier element for protecting a vehicle door interior panel of a vehicle door from an occupant of an adjacent vehicle seat, comprising:
    a body shaped to enclose the vehicle door interior panel and to block the occupant's access to an interior door handle, a lock control and a window control, wherein the body has a self-supporting shape and is configured to cover the vehicle door interior panel from its top extent to its bottom extent and from its forward extent to its rear extent, the body comprising a main surface and adjoining forward side, rear side, top side and bottom side surfaces,
    a cutout defined in one of the side surfaces to provide an unobstructed open area through which a vehicle door accessory light can operate when the vehicle door is open,
    an arm rest portion formed in the body and projecting away from a surrounding surface of the body, the arm rest portion defining a self-supporting shape that follows contours of an arm rest of the interior vehicle door panel and provides an arm rest surface upon which an arm can be rested,
    wherein the barrier element is securable to the vehicle door with fasteners extending through at least two of the side surfaces such that the vehicle door must be opened to permit removal of the barrier element to expose the vehicle door interior panel, thereby resisting efforts by the occupant to tamper with the vehicle door or the vehicle door interior panel.

2. The barrier element of claim 1, wherein the barrier element is formed as a single piece.

3. The barrier element of claim 1, wherein the barrier element is made of vacuum formed plastic.

4. The barrier element of claim 1, wherein the barrier element is shaped to cover at least one recess in the vehicle door interior panel when secured to the vehicle door or vehicle door interior panel.

5. The barrier element of claim 4, wherein the barrier element comprises a planar or a convex surface in the area of the recess in the door panel.

6. The barrier element of claim 1, wherein the barrier element is smoothly contoured.

7. The barrier element of claim 1, wherein the arm rest portion protrudes from the surrounding surface of the body in a direction toward an interior of the vehicle relative to an installed position of the barrier element.

8. The barrier element of claim 1, wherein the barrier element is formed from steel.

9. The barrier element of claim 1, wherein the barrier element is secured to the vehicle door interior panel or the vehicle door with an adhesive.

\* \* \* \* \*